Patented June 4, 1940

2,203,274

UNITED STATES PATENT OFFICE 2,203,274

ELASTIC COATING

William J. Anderson and Samuel S. Rosen, New York, N. Y., assignors to Protex Industries, Inc., New York, N. Y., a corporation of New York No Drawing. Application October 15, 1936,
Serial No. 105,674

18 Claims. (Cl. 47—6)

The purpose of this invention is to provide an improved method of protecting plants, shrubbery, trees, and the like, particularly after having been planted, and also from sun scorch and winter kill, by applying a protective coating or covering of a caoutchouc commonly known as latex.

This caoutchouc substance is particularly adapted for use also in protecting and preserving plant life by spraying or dipping, adhesive wetting or spreading for insecticides, protecting against rodents, or as a repellent to dogs, insects, or animals, and for preserving cut flowers, plants, and trees, and may be used in combination with a pigment for color, an alkaloid or commercial aloes as repellents, and a suitable food for plant life.

Others have endeavored to protect plant life by checking transpiration by coating the roots and a major portion of the plant with a similar product, but as substantially all transpiration is through the leaves, branches and foliage, this invention relates to coating the foliage, leaves, and branches, not only in transplanting, but also of living plants, and to coat them with a substance containing a white pigment for reflecting rather than absorbing light or sun rays, or an alkaloid or commercial aloes as a repellent to insects or rodents, or, when used around the roots in transplanting, a nutritive substance feeding said roots; and when used on the ground around the tree or plant, humus for killing and preventing weeds.

One purpose of this invention is, therefore, to protect trees, plants, shrubbery, cuttings, tubers, bulbs, and the like in transplanting and from winter kill, sun scorch, and excess sunlight, by a coating, which at the same time provides a fireproofing and insulating covering, and which may also be used on the ground around a tree or plant as a mulch for preventing and destroying weeds.

Many plants are grown commercially on an enormous scale in nurseries and are successively transplanted into new locations and finally to their final location in an orchard or garden at an advance stage of growth. Certain of them are even dug up in the fall and stored out of the ground over winter before being replanted in new locations in the spring. In the course of this transplanting operation the roots are unavoidably damaged so that the plant when replanted is unable to absorb moisture and nutritional elements from the soil at its normal rate. The exposure of the roots of cone bearing trees for even a few minutes causes the resinous sap to harden and thus kill them. On the other hand the roots of elms, maples, etc., cannot survive an exposure of more than two or three hours without being adversely affected as is usually evidenced by reduced vigor. If the evaporation of moisture from the leaves and branches by normal transpiration exceeds the amount absorbed through the roots, the plant speedily withers and dies. In order to overcome excessive evaporation the leafy branches may be drastically pruned away, but nevertheless the mortality of transplanted stock has always been very high.

In many cases the plants have died in storage or during transit from one location to another by reason of evaporation of moisture from the roots and branches. It has therefore been customary to dig up a ball of earth surrounding the roots and to transfer the plant with the earth as nearly intact as may be, or alternately to wrap the roots in moist moss, burlap, or other absorbent material. These expedients have involved the transportation of huge masses of inert materal, sometimes aggregating a ton or more in the case of particularly large trees, thus enormously increasing the mechanical difficulties of transplanting.

The inevitable damage to the roots and other parts of the plant, as well as the deliberate pruning of the branches, expose the plants in a very critical period of their existence to infection by numerous plant pests, including fungous diseases, insect attacks, etc. Such infections are particularly prevalent in storage cellars and in such places often spread rapidly from plant to plant.

Attempts have heretofore been made to overcome the difficulties mentioned above by treating the plants with protective films of a relatively impervious nature, including oil and waxes. Oils, however, are toxic to many varieties of plants, and because of their permanently fluid condition do not form adequately permanent films on the plant surfaces. Waxes, on the other hand, are necessarily applied in a heated molten condition, and if applied too hot damage the plants, while if applied too cold they form an unsightly and wasteful deposit which readily cracks and breaks away from the plant surfaces. The wax, in any case, has to be applied with considerable care, in order to prevent its reaching the roots, for the hot wax treatment of the roots has not been found to be permissible.

Later or more modern attempts have been made to protect the plants by coating the roots and stems with a thin film of rubber, and as in the above cases, the branches are pruned away to compensate for the loss of moisture due to injured or broken roots. However, these applications have been directed more or less exclusively to dormant stock out of the ground and plants in the process of transplanting; whereas this invention relates primarily to material that is already established and grown. These experiments have proved unsatisfactory and, therefore, it is the purpose of this invention to cover the entire plant including the branches, leaves, and foliage, thereby absolutely preventing excessive transpiration, and with the branches and leaves completely coated it has been found that the loss of the few roots in transplanting is not so detrimental to the plant in its new growth. Plants and shrubbery are also injured and the mortality is relatively great from what is known as winter kill, in which the foliage is subjected to extreme changes in temperature, and with the ground frozen it is impossible to draw sufficient moisture therefrom to compensate for that absorbed by wind, and considerable drops in temperature and, therefore, it has been found that by completely covering shrubbery and plants and particularly hedges with a thin film of rubber in the fall the plants are insulated and protected from winter kill, so that when growth is started in the spring the sap is already in the branches and does not have to be drawn up therethrough from the ground. Coating the plants in this manner also preserves the green foliage and makes it possible to retain a neat appearing hedge or plant throughout the winter. Pigmenting this substance with a white pigment also makes the hedge or plant white and therefore provides a change in the color scheme which is very attractive particularly for the winter season.

Tests have been made on trees such as those normally used for Christmas trees in which the tree is completely separated from the roots and with trees coated in this manner the natural freshness and color is retained so that trees may be used for several months, whereas trees without an application of this substance droop and turn brown and the needles drop off in a few weeks. The rubber coating not only retains the moisture in the tree, but also holds the needles in place, giving the tree a fresh, natural appearance. Other materials such as boric acid, sodium tungstate, cellulose acetate, or ammonium sulphate, or any fireproofing agent, may be inserted in this substance to make it non-inflammable, for use in checking forest fires and also for fireproofing Christmas trees and decorations, particularly for department stores, theatres, churches, and homes, thereby making it possible to use decorations which in some localities are forbidden by fire regulations. In reforestation, many small trees are often planted along the highways and throughout the country, and then left to grow without any attention whatever, and the mortality is very high because weeds snuff out the small trees or plants. In order to make forest planting economically practical, the trees must be planted at small cost, therefore, small sizes are used and they must be planted rapidly to keep down the expense, and the trees receive hardly any further attention with the result that weeds, which grow faster than trees, compete with the trees in absorbing soil nutrition, and shut out light and air, whereas with this substance used as a mulch on the ground around the small plants the weeds will be eliminated, and with the plants coated with this substance having an alkaloid or commercial aloes with a bitter taste therein, the plants will be protected from rabbits, gophers, and the like.

Another purpose of this invention is to supply nutriment to plant life through a coating by the introduction of peat moss or humus into latex for the purpose of dipping the roots of trees, plants, shrubs and the like therein. This method is vastly superior to anything previously practiced in the art, as due to the high moisture retaining properties of the solution, plants so treated live much longer than when treated by the former method. It is obvious that the moisture retained by the organic material is responsible for the condition of longevity, and by adding small quantities of water soluble nitrogen, potash and phosphoric acid to the solution a sufficient amount of nutriment is supplied to prolong the life cycle.

The plant dipped in this solution retains an admixture of latex and organic material, the form of which may evolve itself into more or less of an oval shape, and as the porosity of the material may be controlled by the granular size of the organic materials incorporated therein, the plant may be submerged from time to time as may be required in water, thus the moisture evaporated from the peat moss is replenished.

This invention also includes the addition of secondary sex hormones or theelin such as derivatives of urine from pregnant women, mares, or from stallions into the latex solution, thus when roots are dipped into said solution, the general welfare of the plant is materially aided due to the action of the secondary sex hormones in expediting and stimulating root development. This invention further contemplates the use of latex for grafting, although the coating of scions with a film of rubber has been previously practiced in the art. However, by introducing secondary sex principles into the latex solution and applying the finished material just after severance from the parent stock, the scions are united to their new hosts much more rapidly and effectively. An antiseptic, such as a coal tar or pine oil disinfectant may be used in combination with the latex, particularly when used as a cavity or wound dressing.

In addition to protecting, preserving and nourishing plant life, this coating is also useful for preventing mortality of rose bushes, hedges, plants, and grass, and the like in winter, and may also be sprayed over grass as in lawns to prevent burning in summer, and also winter kill in winter. It may also be placed around vegetables, decorative and vegetable plants in transplanting and while growing to prevent excessive transpiration and also for eliminating weeds.

Cut flowers have always been a problem, and by coating these with a thin transparent film of latex, either by spraying or dipping, transpiration therefrom will be eliminated so that they will maintain their freshness.

It may also be used as an adhesive wetting or spreading agent for insecticides, as heretofore soaps, fatty acids, and casein have normally been used as adhesive wetting and spreading agents of spray materials, but being water soluble, they are readily washed away, whereas as latex vulcanizes, it becomes impervious to water, and the toxic principles become an integral part of the film, and adhere to the foliage for a considerable length of time. The latex can be used in combination with other toxic principles or agents.

The material may also be used in combination with leaves, peat moss and the like for covering or protecting plants, by spraying or applying it over the surface, thereby forming a binder or surface covering.

This invention, therefore, relates to a coating adapted to be applied, in solution, by spraying, painting, as with a brush, pouring, or in any manner, which may be of an elastic nature, and which is adapted to be applied to the trunks, limbs, branches, roots, or shoots of trees, plants, shrubbery, or the like, or as a covering coating the entire tree, or plant, which is not harmful to the tree, plant, or the like, which does not form a nest to harbor and incubate insects, bacteria, and the like, which may be provided of any or various colors and may reflect rather than absorb rays of light, which will expand with the growth of the tree or plant and not restrict normal development thereof, and which will function as an insulator to prevent sun scald, wilting, drying out of bark tissues and similar injuries by controlling sudden drops in temperature which have been found to be the fundamental cause of these abuses.

The invention uses as a foundation a caoutchouc substance, a derivative of many tropical plants obtained from the cortex of certain trees by a process of tapping. A thin shaving of bark is cut away at each tapping to open up the ends of the latex vessels. These vessels permeate the inner layers of the cortex and when they are cut the latex exudes.

Different substances have been used for protecting plants, and the like, such as paint, whitewash, straw, and burlap, however, with the natural growth of the trees the whitewash cracks, leaving portions unprotected, and in any covering formed by straw, burlap and the like, incubating and harboring spaces are provided for insects and the like and, therefore, it is desired to provide a coating which is adapted to stretch with the normal growth of the tree or plant, which completely closes all pockets in and around the bark, which has sufficient surface tension to prevent penetrating through the bark, and which at the same time reflects instead of absorbs sun rays.

One of the objects of this invention is to utilize latex as a base for the protection of trees, plants, shrubs, bulbs, deciduous, coniferous, perennial, biennial and annual seedlings and cuttings by covering the entire plant or any part thereof, or for grafting. The latex may be pigmented or unpigmented.

It is a further object of this invention to utilize the application of this material on certain trees to prevent injuries of the bark and wood that are, more or less, common to all kinds of trees. Extremes of temperature, sun scald, or scorch, radiation, frost, winter kill, insects, wounds, abrasions and excessive transpiration are some of the casual agents which affect trees and vegetation in general.

Another object of this invention is to pigment the latex solution preferably with a white pigment and in this manner regulate the temperature. Owing to the dark color of the bark, the wood of a tree absorbs the heat of direct sunlight and thus during a part of the day, may be at a temperature well above that of the air, whereas the color of the finished material would reflect rather than absorb the rays of the sun, thereby preventing such wide extremes of temperature on the southwest sides of trees, the cause of sun scorch and scald.

Another object of this invention is to provide a flexible coating of rubber to trees, plants, shrubs, etc., that will expand as the treated subject grows.

A further object of this invention is to provide a coating of rubber in combination with alkaloids on various types of trees and flora in which a fumigant, fungicide, contact or stomach insecticide has been incorporated which will kill and repel insect fauna which not only serves the above-mentioned purposes but kills scale organisms, borers, sucking and chewing insects and their eggs when present on the treated areas.

This method is highly efficacious in repelling and killing borers and will be found to be exceedingly efficient in controlling the peach tree borer (sanninoidea exitiosa) by painting the lower portion of the trunk during the period the moths are in flight, from June to September, or treating prior to planting or shortly thereafter.

Another object of this invention is to cover trees, plants, shrubs, bulbs, perennials wholly or any part thereof with a relatively thin membrane of rubber which adheres and conforms to the contour of the treated subject and to all indentations thereon.

A further object of this invention is to provide a protective coating of rubber and a repellent for fruit trees against many species of mice, rabbits and gophers which injure fruit trees by eating the bark from around the trees. Tar paper has been commonly used, but it must be removed each spring or it will burn the young trees. The repellent effect in the rubber is provided by adding one pound of commercial aloes to four gallons of latex material. This gives the finished rubber film a very bitter taste.

Another object of this invention is to provide a pigmented film of rubber to trees, plants, and the like, that will reflect light thereby decreasing the amount of transpiration.

Since dark objects exposed to the sun radiate heat rapidly at night, they may reach a temperature several degrees below that of the air and so it is possible to prevent injury to trunks and lower branches of citrus trees, fig trees and other types of fruit trees by applying a white coating of rubber to reflect, rather than absorb heat.

Another object of this invention is in the reduction of radiation by the application of a white covering to trunks and branches of trees. This application does not keep the tree trunks warmer at night than the air, but it reduces radiation from the parts covered and thus keeps them nearly as warm as the air.

Another object of this invention is to provide a mulch for plants. Numerous attempts have been made in this direction, the like of applications of manure or other loose materials such as straw or leaves, spread thickly on the surface of the ground around newly planted trees and other plants to protect the roots from the drying effects of the wind and sun. Then again, an impervious, black paper has been used which is spread upon the ground and held down either by soil piled around the edges or by wires or laths and stones stretched across it. However, all of these efforts have their limitations in that manure carries a high weed content and the free ammonia in itself causes the plants to burn when it comes in contact with same. With the paper form of mulch it is decidedly inconvenient to apply and it retains no moisture. The mulch prepared with rubber as a base is treated with organic materials the like of peat moss and humus. The mulch prepared with latex, humus, or peat moss, retains in itself a considerable amount of moisture, and as an illustration of the moisture-retaining properties of this type of mulch, the following is noted: garden loam holds about 55% of its weight in moisture, and sand 22%; whereas the latex-peat-moss mulch combination retains upwards of 600% in moisture. This acts as a continuous reservoir of water, feeds the plant, and guards it against ground evaporation which is 90%.

The latex may therefore be used in combination with peat moss for keeping, or feeding ordinary plants, or may be combined with a fertilizer to give further nutrition, and may also be combined with secondary sex principles, for stimulating growth, particularly of the roots of plants, cuttings, and the like.

Another object of this invention is to supply a rubber base mulch with humus or peat moss incorporated therein. This mulch being in a liquid form is more readily applied, is free from obnoxious weeds, contains no unsightly extraneous matter, and as it becomes an integral part of the soil structure it is not necessary to fasten it down with cumbersome stones, wires, and the like, because it conforms to the contour of the ground and vulcanizes with low temperature.

Another object of this invention is to supply a rubber membrane superposed over vegetation. This film protects vegetation from the exhaust of blast furnaces, motor vehicles, and the like. The exhaust constituents contain sulphur and other impurities toxic to vegetation, and when this residuum sets upon the membrane treated foliage, the film protects the vegetation from the caustic effects of these toxic elements.

A further object of this invention is to provide a rubber membrane on plants, similar to roses. Waxes have been used for this purpose, however, they have the following limitations in that it requires a heating process that necessitates heat to keep the wax in a molten mass and furthermore the wax, being rigid and brittle, peels, chips and blisters. These disadvantages are overcome with this invention as the liquid requires no heat and vulcanizes at low temperatures, and being flexible it will not crack, chip, blister and peel.

And a still further object of this invention is to provide a process for dipping plants and the like in order to coat them with a rubber membrane. For this purpose the requisite quantity of colloidal sulphur paste, colloidal zinc oxide, i. e., zinc oxide in a specially fine state of division and accelerator and the like is added. It is necessary for the vulcanizing agents to be as finely divided as possible (colloidal) so that they remain in suspension and do not settle out while dipping is in progress. In addition to the vulcanizing agents, other compounding ingredients, such as colors, anti-tackey agents, softeners (oils, waxes, and the like) mineral fillers and antioxidants may be added, depending on the type of final product required. It is advantageous to start with a concentrated latex, because it has a greater viscosity (depending on the dry-rubber content) and, therefore, leaves a thicker deposit each time the former is dipped into it. Such latex as the sixty per cent dry-rubber content prepared in accordance with the usual practice is especially suitable because in addition to increasing the rubber content the concentration process purifies the latex and reduces the proportion of non-rubber water-soluble constituents.

Sulphur, lime, manganese, or any similar anti-tackey substances may be used in combination with latex to prevent its being sticky; commercial aloes may also be added to give the coating a bitter taste, or to make it a repellent to dogs, rabbits, gophers, and the like; water-soluble nitrogen, potash and phosphoric acid may be added to make it nutritive to plants; or fillers may be added to increase the surface tension or starch to reduce the surface tension, for some uses.

In conducting the procedure of coating the plant, a coating is provided which does not bleed or run into the plant, and furthermore, any desired thickness of rubber can be built up.

An aqueous rubber solution which has been found to give a satisfactory coating is one containing about one hundred parts by weight of rubber, about two to three parts by weight of sulphur, about two to three parts by weight of zinc oxide and about one part by weight of ultra-rapid accelerator such as xanthate or the like. As those skilled in the art know, ultra-rapid accelerators include the class of dithio acids, dithio-carbamate, with or without an addition of a potassium salt of mercaptobenzothiazole, piperidinepentamethylene-dithiocarbamate, tetramethylthiuram disulfide, zinc dimethyl dithiocarbamate, zinc-diethyl dithiocarbamate, lead-dimethyl dithiocarbamate, and sodium isopropyl xanthate. Usually, the solids in the rubber solution can be present to an extent of about thirty-five to about forty per cent by weight. In practice satisfactory results have been obtained with about thirty-eight per cent by weight of solids. Of course, concentrated rubber solutions can be used. Therefore, a concentrated rubber solution can be used containing about sixty per cent by weight of solids. In the event that it is desired to color the rubber, any appropriate coloring agent may be used. Generally speaking it is preferred to use a pigment color, and it is also preferred to use anti-tackey agents.

It is understood that these proportions may be altered by adding or detracting therefrom without departing from the spirit of the invention.

The order of addition of the ingredients is important, since many compounding ingredients coagulate latex unless previously dispersed or wet in water or other emulsifying liquid. The above mixing contains very little solid material and is easily prepared by weighing out the accelerator and zinc oxide, moistening these with water, or dilute ammonia solution, and mixing with the sulphur paste.

Plants and trees suffer commonly from a drying up of the foliage due to overtranspiration of water.

Transpiration is the term applied to the escape of water from leaves and other parts of the plant in the form of vapor.

There is no closed "circulation" of sap in plants comparable to the streaming of blood in animals. Water which generally contains various mineral soil constituents in solution enters the roots, and most of it passes upward through the stems directly to the leaves where it is evaporated.

The movement of water set up by transpiration carries water and the contained salts to the centers of food formation in the leaves, and the evaporation process facilitates exchange of gases with the air. The evaporation also tends to equalize temperatures. That an enormous amount of work is performed by the plant in transpiration may be seen when it is known that a single sunflower plant will evaporate a pint of water from its leaves in a single day, and about seventy times this much in the course of its development. A birch tree with two hundred thousand leaves will transpire from seventy to one thousand pounds of water daily in the summer. A single oak tree will throw one hundred and twenty or one hundred and thirty tons of water into the air during the course of a season, and an acre of beech trees containing four hundred to six hundred specimens will transpire about two million pounds in a single summer. It is estimated that ninety-eight per cent of the energy derived from sunlight by leaves is expended in the work of transpiration.

Recent investigations of transpiration have been directed toward the relative importance of the various factors controlling the rate of water loss from a plant. It was formerly held that the function of the regulation of transpiration was efficiently discharged by the stomata, and that, therefore, changes of stomatal aperture and of transpiration rate ran closely parallel; on this assumption Darwin based his horn hygroscope and differential temperature methods of estimating stomatal aperture.

Experiments have been carried out with various plants under controlled atmospheric conditions to determine the relationship between stomatal aperture and the rate of transpiration. The results have shown that in many cases there is no agreement between the two, a decreasing transpiration rate being accompanied by stomatal opening and vice versa.

The water content of the leaf was found to be a factor playing a large part in the control of transpiration rate, and a lower transpiration rate resulting from decreased water content.

The stomatal aperture is not reduced by a slight water deficiency in the leaf, hence the ordinary view that stomata, by their response to incipient drying, are the chief factors in maintaining the water-content of the leaf is not tenable.

On the other hand, the stomata are very sensitive to light changes, so that with increasing light intensity the stomata may continue to open whilst the water-content of the leaf is decreasing. The film of latex deflects light, thereby decreasing light intensity causing the stomata to contact—thus decreasing transpiration.

The following will serve to illustrate the part that transpiration plays in winter injury and winter-drying. Conifers which keep their leaves throughout the winter may be injured by winter-drying.

Winter-drying is caused by the rapid loss of water from the leaves at a time when the water in the soil is frozen and is not available to the plant. Strong winds, when the air temperature is either high or low, cause the leaves on the exposed side of the tree to lose water to such an extent that the tissues wilt and die. The factors determining the extent of damage done by winter-drying are: age of the tree, depth of roots in the soil, exposure to prevailing winds, temperature of the air, depth to which the soil-water is frozen, duration of strong winds blowing from a given direction, and the frequency of recurrence of a combination of conditions favorable to winter-drying.

Sun scald or "winter injury" is caused by the evaporation of moisture in the bark under the influence of the mid-winter sun. Unseasonable warm weather causes a greater amount of moisture to evaporate than can be supplied by the roots in the frozen ground, hence the tree is severely injured when the temperature again goes below freezing, usually in the night after a warm afternoon. These conditions cause the bark to split, and in many cases a distinct opening is noticeable in the spring when the sap begins to flow.

Late and early frost adversely affect trees as the young shoots injured by late frost may either wilt through loss of turgor and after again directing their points upward usually become permanently distorted or, as generally happens, they may be killed outright and replaced by one or more volunteer shoots. The structural disturbance initiated by the action of late-frost injury is not confined to the shoots then developing, but extends down the stem for distances varying from several inches to several feet below the base of the injured shoots, or as far as the cambium has been injured by the freezing without entailing the death of the stem.

Frost-ring formation may occur in the wood from the action of either late or early frost during the course of the growing season or from the freezing of the cambium during the winter when the tree is dormant. The frost-rings, therefore, may register at any point within the growth ring signifying the time at which the injury occurred.

Therefore, it seems obvious that by controlling light intensity and heat radiation these injuries can be greatly mitigated and in most instances may be entirely eliminated.

The following temperature readings are the result of an investigation relative to trunk temperatures on the northeast and northwest sides of trees treated with pigmented latex, and tar paper, and including untreated trees as a method of comparison. It will be noted that the temperature on the southwest side of the latex-treated tree is synonymous with the temperature of the northeast side of an untreated tree.

| Temperature | Untreated | Latex | Tar paper |
| --- | --- | --- | --- |
| 89° F | N. E. 81° F | N. E. 78° F | N. E. 99° F. |
| 72° hum | S. W. 99° F | S. W. 81° F | S. W. 120° F. |

Trunk temperatures on the south and southwest sides of trees are much higher during the day than on the other sides. If there should be a sudden drop in the air temperature shortly after the sun goes down, it is apparent that there would be a rather large and rapid temperature change on the southwest side of the trees.

Among the many advantages of this substance when applied to trees and plant life are the facts that it has a high reflective value, is low in heat conductivity, prevents drying out of the stock, prevents winter injury, checks rapid temperature change, prevents sun scald, and other injuries of wood and bark, stops circulation of convection currents, stabilizes trunk temperatures, checks heat absorption, adheres and conforms to tree contours, and indentations, is highly elastic and flexible, expands as the tree grows, and will not bind the tree or plant, or crack, chip, blister or peel. It is ideal as a tree wound dressing, stops bleeding of cell sap, facilitates healing, and therefore, is non-injurious to trees as it cannot penetrate into lenticels.

This substance is inexpensive, easy to apply,—as it may be sprayed on, has no waste,—a gallon covering fifty trees of about one-half inch in diameter, and it has a high surface tension, is a non-conductor of electricity, and is also insect proof, killing plant parasites and wood and bark insects, and repelling rodents, and at the same time it has a constant density, cannot mat, rot or corrode, is indestructible and will not shrink or settle. It contains no lime, so that it will not slack, and is harmless to handle, and also harmless to the tree or plant, as it may be applied cold, and may therefore be applied by any gardener. It may also be provided in various colors by using different pigments and when used as a mulch eliminates weed cultivating and promotes plant growth.

It will be understood, therefore, that this substance which has been described as latex, when used on trees, plants, and the like, covers the entire tree or plant with the leaves and foliage thereof, or may be used as a mulch on the ground surrounding the tree or plant, and in either case may be combined with an alkaloid such as an anabasine sulphate, or commercial aloes such as lauryl rhodanate or the like, to protect the trees or plants from insects, rodents, and the like. The substance may also be combined with humus when used as a mulch for killing weeds around plants.

It will also be understood that latex in the crude form, or rubber, or rubber or latex in combination with any material or materials may be used in some of the applications hereinbefore described. The latex may also be combined with a luminous substance such as a luminous marble substance produced by infusion for coloring, reflecting or modifying light.

And, further, it will also be understood that although an attempt has been made to cover all uses of the product or of these products, it may also be used for many other purposes.

Having thus fully described the invention, what we claim as new and desire to secure by Letters Patent, is:

1. The method or process of dressing cavities, wounds, and the like, of trees and the like, which consists of covering said cavities, wounds, and the like with a film of latex containing secondary sex principles.

2. The method as described in claim 1 further characterized by a white pigment in combination with the latex for reflecting rays of light.

3. The method or process of protecting plant life in grafting which consists of covering the graft with latex in combination with the secondary sex principles.

4. A coating for trees, plants, and the like, comprising an aqueous rubber solution containing one hundred parts by weight of rubber, two to three parts by weight of sulphur, two to three parts by weight of zinc oxide, one part by weight of ultra-rapid accelerator such as xanthate or the like, and a pigment as a coloring agent, characterized in that the solution contains about 38% by weight of solids.

5. In combination with a coating as described in claim 4, an alkaloid as a repellent.

6. In combination with a coating as described in claim 4, commercial aloes as a repellent to insect and animal life.

7. In combination with a coating as described in claim 4, lauryl rhodanate, as a repellent for insects and the like.

8. In combination with a coating as described in claim 4, secondary sex principles for stimulating growth.

9. In combination with a coating as described in claim 4, fertilizer for providing nutrition to plant life and the like.

10. In combination with a coating as described in claim 4, peat moss, as a fertilizer for plant life covered with the coating.

11. In combination with a coating as described in claim 4, peat moss for fertilizing, and secondary sex principles for stimulating growth of plant life upon which the coating is used.

12. A coating as described in claim 4, in which the sulphur and zinc oxide are colloidal, or in an especially fine state of division whereby they will remain in suspension.

13. A thin film or coating for trees, plants, and the like, comprising a caoutchouc substance as a base, sulphur and zinc oxide as vulcanizing agents, and xanthate as an accelerator, characterized in that the solution contains about 38% of solids by weight.

14. In combination with a substance as described in claim 13, secondary sex principles and a suitable fertilizer.

15. In combination with a substance as described in claim 13, a luminous marble substance produced by infusion for coloring, reflecting, or modifying light.

16. In combination with a substance as described in claim 13, a coloring pigment.

17. In combination with a substance as described in claim 13, an alkaloid such as anabasine sulphate as an insect repellent.

18. A substance as described in claim 13, in which the xanthate or accelerator includes the class of dithio acids or dithiocarbamate, and sodium isopropyl xanthate.

WILLIAM J. ANDERSON.
SAMUEL S. ROSEN.